US012650528B2

(12) United States Patent
Azuma et al.

(10) Patent No.: US 12,650,528 B2
(45) Date of Patent: Jun. 9, 2026

(54) NEUTRON FLUX MEASUREMENT APPARATUS

(71) Applicant: Mitsubishi Electric Corporation, Tokyo (JP)

(72) Inventors: Tetsushi Azuma, Tokyo (JP); Makoto Sasano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 329 days.

(21) Appl. No.: 18/547,757

(22) PCT Filed: Apr. 7, 2021

(86) PCT No.: PCT/JP2021/014758
§ 371 (c)(1),
(2) Date: Aug. 24, 2023

(87) PCT Pub. No.: WO2022/215192
PCT Pub. Date: Oct. 13, 2022

(65) Prior Publication Data
US 2024/0145107 A1     May 2, 2024

(51) Int. Cl.
*G01T 7/00* (2006.01)
*G01T 1/17* (2006.01)
(Continued)

(52) U.S. Cl.
CPC ................ *G01T 7/005* (2013.01); *G01T 1/17* (2013.01); *G01T 3/006* (2013.01); *G21C 17/108* (2013.01)

(58) Field of Classification Search
CPC ........... G01T 7/005; G01T 1/17; G01T 3/006; G21C 17/108
See application file for complete search history.

(56) References Cited

U.S. PATENT DOCUMENTS

| | | | | |
|---|---|---|---|---|
| 4,284,893 A | * | 8/1981 | Allan | ...................... G01T 3/006 376/153 |
| 5,251,242 A | * | 10/1993 | Impink, Jr. | ............. G01T 3/006 376/245 |

(Continued)

FOREIGN PATENT DOCUMENTS

| | | |
|---|---|---|
| JP | S57184991 A | 11/1982 |
| JP | 2006250802 A | 9/2006 |
| JP | 2007225296 A | 9/2007 |

OTHER PUBLICATIONS

International Search Report (PCT/ISA/210) with translation and Written Opinion (PCT/ISA/237) mailed on Jul. 6, 2021, by the Japan Patent Office as the International Searching Authority for International Application No. PCT/JP2021/014758. (9 pages).

*Primary Examiner* — Hugh Maupin
(74) *Attorney, Agent, or Firm* — BUCHANAN, INGERSOLL & ROONEY PC

(57) ABSTRACT

A neutron flux measurement apparatus includes: a storage which records, as record data, a measured value indicating change in a neutron flux in a nuclear reactor corresponding to adjustment control for output of the nuclear reactor during a first set period; and a calculation circuitry which, on the basis of the record data, performs correction for a detector sensitivity to a neutron of a self-powered detector at a time point in accordance with the adjustment control during a second set period after the first set period, the time point being a time point when the second set period has elapsed, and derives the neutron flux at the time point using the corrected detector sensitivity.

21 Claims, 12 Drawing Sheets

100

(51) Int. Cl.
    *G01T 3/00*         (2006.01)
    *G21C 17/108*     (2006.01)

(56)               References Cited

U.S. PATENT DOCUMENTS

| | | | |
|---|---|---|---|
| 5,745,538 A * | 4/1998 | Heibel | G21C 17/108 |
| | | | 376/254 |
| 2012/0091327 A1* | 4/2012 | Holaday | G21C 17/108 |
| | | | 250/252.1 |
| 2014/0362966 A1* | 12/2014 | Fushimi | G21C 17/10 |
| | | | 376/254 |
| 2018/0180750 A1* | 6/2018 | Mcgregor | G01T 3/008 |
| 2018/0350473 A1* | 12/2018 | van der Ende | G21C 17/108 |

* cited by examiner

100

200

HIGH-ORDER DEVICE    3

10

NEUTRON FLUX CORRECTION CALCULATION UNIT    11

DETECTOR SENSITIVITY CORRECTION CALCULATION UNIT    13    Ta

NEUTRON FLUX STORAGE UNIT    12

RECORD DATA    D

NEUTRON COUNTING UNIT    2

SELF-POWERED NEUTRON DETECTOR    1

NEUTRON FLUX MEASUREMENT APPARATUS

TECHNICAL FIELD

The present disclosure relates to a neutron flux measurement apparatus.

BACKGROUND ART

Conventionally, a neutron flux measurement apparatus using output of a self-powered neutron detector for detecting neutrons has been used for continuously measuring a neutron flux or a distribution thereof in a nuclear reactor.

In general, for the self-powered neutron detector, a material called an emitter material, which comparatively readily reacts with a neutron, such as rhodium or vanadium is used. Such materials have a high neutron capture cross-section which means the probability of reaction with a neutron, and therefore cause a dominantly large amount of radioactivation reaction through interaction with neutrons, and then cause beta decay at the time of transition to a stable atom through nuclear transmutation by capturing a neutron. Meanwhile, on the outer side of the emitter material, a material called a collector material, which has a low neutron capture cross-section, is formed with an insulator therebetween. Thus, the collector material is relatively less likely to cause interaction with a neutron than the emitter material, and both materials are electrically insulated from each other.

Here, the self-powered neutron detector having rhodium, vanadium, or the like as the emitter material outputs current based on electrons emitted by beta decay due to radioactivation of the emitter material through neutron irradiation. Then, by measuring the output current proportional to the neutron flux, the neutron flux is indirectly measured. In the self-powered neutron detector, the emitter material is consumed through interaction with neutrons, and therefore the detector sensitivity to a neutron reduces in accordance with the neutron irradiation amount. Thus, with respect to the same neutron flux, output current from the self-powered detector reduces in accordance with the degree of consumption of the emitter material. Accordingly, it is necessary to regularly correct the detector sensitivity during a period in which the self-powered detector cannot be replaced, i.e., at least an operation cycle period of the nuclear reactor.

In general, the neutron flux in the nuclear reactor is related to the nuclear reactor output, and therefore the neutron irradiation amount of the detector fixed in the reactor depends on the operation mode of the nuclear reactor during the operation cycle period. Conventionally, from the perspective of economic efficiency or reliably ensuring operation, an operation mode in which output of the nuclear reactor is not excessively changed or the rated output as the base load power supply is kept constant as in Japan, has been adopted. In a case where the nuclear reactor output does not frequently change as described above, as a neutron flux measurement apparatus for correcting reduction of the detector sensitivity, the following nuclear reactor internal neutron flux measurement apparatus is disclosed.

That is, the nuclear reactor internal neutron flux measurement apparatus as a conventional neutron flux measurement apparatus is a nuclear reactor core internal neutron flux measurement apparatus using a self-powered neutron detector fixed in a reactor core, and provided with correction means for performing neutron sensitivity correction for the self-powered neutron detector at each certain measurement interval $\Delta t$ by the following expression:

$$Sn = Sn{-}1 \cdot \exp(-\sigma) \cdot \varphi n{-}1 \cdot \Delta t$$

where

Sn is the neutron sensitivity of the self-powered neutron detector at time $tn{-}1 = tn{-}\Delta t11$ Sn$-1$ is the neutron sensitivity of the self-powered neutron detector at time $t{-}1 = tn{-}\Delta t$ $\sigma$ is the neutron absorption cross-section of the emitter material of the self-powered neutron detector, and $\varphi n{-}1$ is the neutron flux at a neutron detector position at time $tn{-}1 = tn{-}\Delta t$ (see, for example, Patent Document 1).

CITATION LIST

Patent Document

Patent Document 1: Japanese Laid-Open Patent Publication No. 57-184991

SUMMARY OF THE INVENTION

Problem to be Solved by the Invention

In Patent Document 1, under the assumption that output of the nuclear reactor hardly changes in the operation mode, i.e., change per the measurement interval at for the neutron flux inside the reactor is small, the detector sensitivity Sn at the present time $t = tn$ is approximated using only the detector sensitivity Sn at a time point $(tn{-}\Delta t)$ preceding by at from tn. That is, under the assumption that the neutron flux measured at a measurement start time point simply attenuates, consumption of the emitter material is predicted using simple attenuation calculation in accordance with a total neutron irradiation amount with respect to a measurement period, and reduction in the detector sensitivity of the self-powered neutron detector is corrected.

However, in energy mix of electric generation sources devised in recent years, an electric generation system in which an electric generation method using renewable energy and not having an output adjustment function, and nuclear power generation, are combined, is used. In this case, it is necessary to take an operation mode in which the electric generation amount of nuclear power generation is flexibly changed, e.g., a load following operation mode, and thus the neutron flux in the nuclear reactor also changes frequently along with change in the nuclear reactor output. Therefore, the nuclear reactor internal neutron flux measurement apparatus in Patent Document 1 cannot accurately perform correction for the detector sensitivity. Then, since reduction in the detector sensitivity of the self-powered neutron detector due to consumption of the emitter material cannot be accurately corrected, correction errors of the detector sensitivity are accumulated at, a later stage of the operation cycle, so that there is a problem of significantly losing measurement accuracy for the neutron flux.

The present disclosure has been made to solve the above problem, and an object of the present disclosure is to provide a neutron flux measurement apparatus that can measure a neutron flux with high accuracy even in such a case where output of a nuclear reactor changes.

Means to Solve the Problem

A neutron flux measurement apparatus according to the present disclosure includes: a self-powered detector which detects a neutron in a nuclear reactor; a neutron flux counting unit which measures a neutron flux in the nuclear reactor on the basis of output of the self-powered detector; a storage unit which records, as record data, a measured value indicating change in the neutron flux in the nuclear reactor corresponding to adjustment control for output of the nuclear reactor during a first set period; and a calculation unit which, on the basis of the record data, performs correction for a detector sensitivity to a neutron of the self-powered detector at a time point t1 in accordance with the adjustment control during a second set period after the first set period, the time point t1 being a time point, when the second set period has elapsed, and derives the neutron flux at the time point t1 using the corrected detector sensitivity.

Effect of the Invention

The neutron flux measurement apparatus according to the present disclosure makes it possible to provide a neutron flux measurement apparatus that can measure a neutron flux with high accuracy even in such a case where output of a nuclear reactor changes.

DESCRIPTION OF EMBODIMENTS

Embodiment 1

Hereinafter, a neutron flux measurement apparatus 100 according to the present embodiment for measuring a neutron flux in a nuclear reactor will be described.

Figure 1:
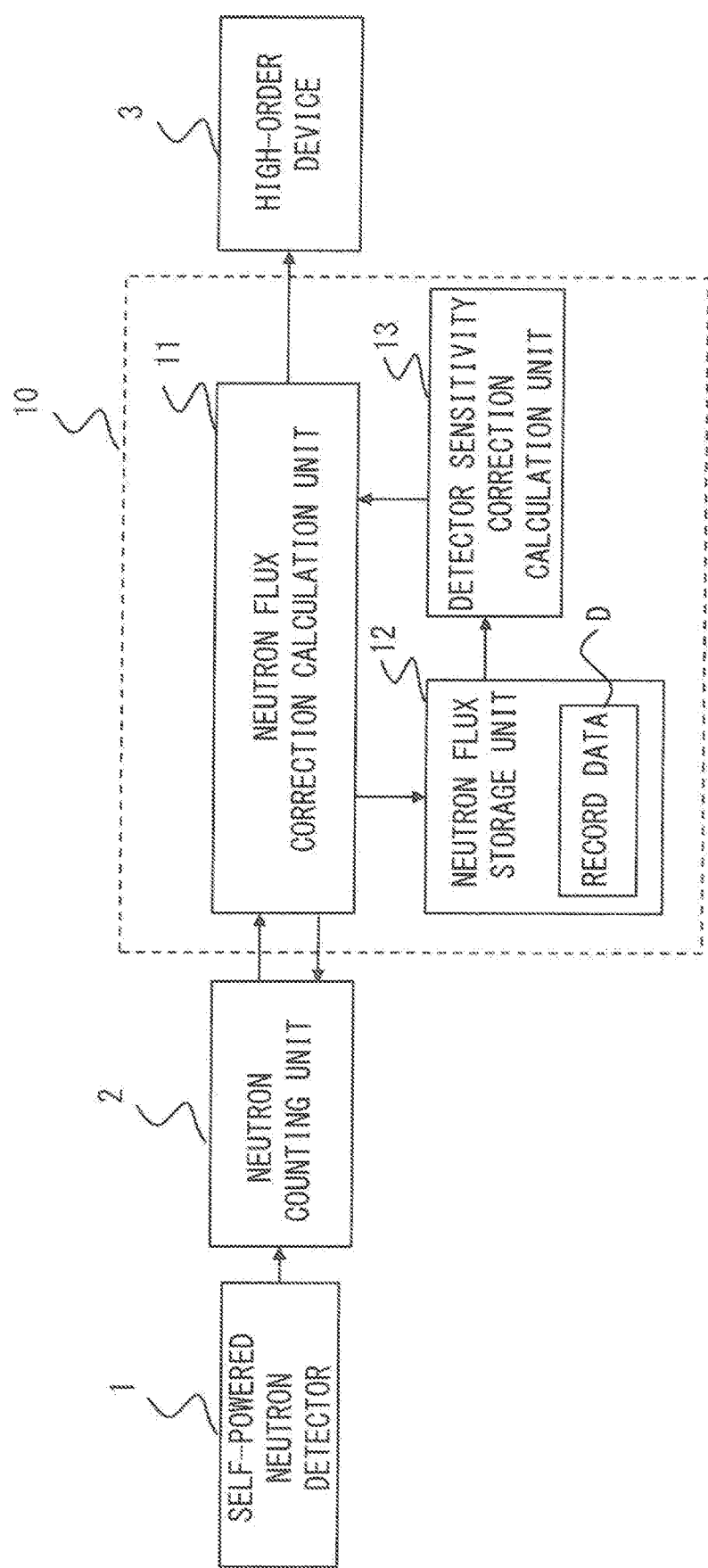
FIG. 1 is a block diagram showing the schematic configuration of a neutron flux measurement apparatus according to embodiment 1.

FIG. 1 is a block diagram showing the schematic configuration of the neutron flux measurement apparatus 100 according to embodiment 1.

As shown in FIG. A, the neutron flux measurement apparatus 100 includes a self-powered neutron detector 1 as a self-powered detector, a neutron flux counting unit 2, a calculation unit 10, and a high-order device 3.

Hereinafter, the details of these units composing the neutron flux measurement apparatus 100 will be described.

First, the self-powered neutron detector 1 will be described.

Figure 2:
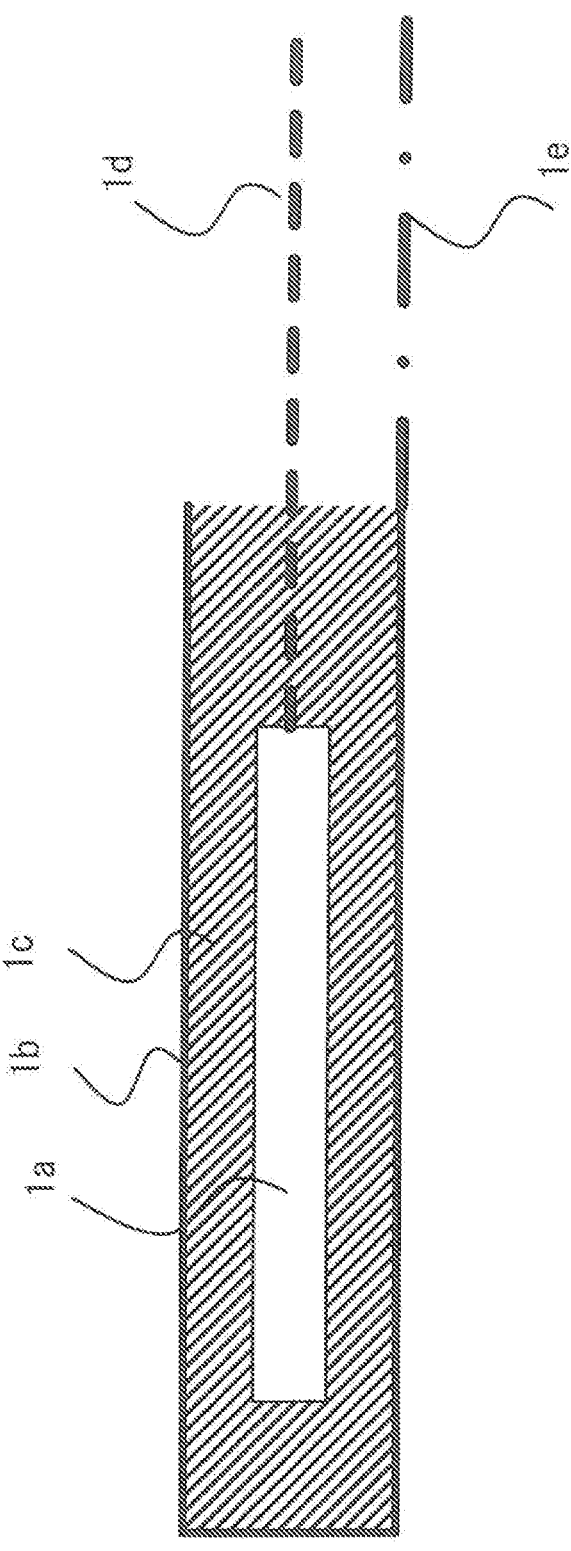
FIG. 2 shows the schematic configuration of a self-powered neutron detector according to embodiment 1.

FIG. 2 shows the schematic configuration of the self-powered neutron detector 1 shown in FIG. 1.

The self-powered neutron detector 1 is placed in a reactor core of the nuclear reactor and detects a neutron in the reactor core.

As shown in FIG. 2, the self-powered neutron detector 1 includes an emitter material 1a which is metal of a sensing portion, a collector material 1b which is a coating material, an insulator 1c provided between the emitter material 1a and the collector material 1b, and signal lines 1d, 1e respectively connected to the emitter material 1a and the collector material 1b, for example.

In the self-powered neutron detector 1, current is generated through radioactivation or nuclear reaction due to a neutron incident on the emitter material 1a, and the generated current is outputted to the outside. Therefore, the self-powered neutron detector 1 does not require supply of external power for driving into a state capable of detecting a neutron, and outputs current having a magnitude uniquely determined in accordance with a neutron flux at the position where the self-powered neutron detector 1 is placed in the reactor. The outputted current is inputted to the neutron flux counting unit 2 via the signal lines 1d, 1e.

As the metal material of the emitter material 1a, in general, rhodium, vanadium, or cobalt is used in view of conditions such as the magnitude of a radioactivation cross-section for a neutron and a decay time constant after radioactivation.

Next, the neutron flux counting unit 2 will, be described.

The neutron flux counting unit 2 receives the current outputted from the self-powered neutron detector 1 and has a function of performing conversion to a neutron flux based on the magnitude of the received current and counting the converted neutron flux. The neutron flux counting unit 2 performs calculation by the following Expression (1) to perform the above conversion from the received current to a neutron flux.

[Mathematical 1]

$$\Phi = I/S \tag{1}$$

Here, $\varphi$ is the number of neutrons passing through a unit area in unit time or the sum of distances that neutrons have traveled in a unit volume in a unit time.

I is the value of current outputted from the self-powered neutron detector 1.

S is the detector sensitivity of the self-powered neutron detector 2 obtained by dividing the current from the self-powered neutron detector 1 by the neutron flux density.

In a case where the detector sensitivity of the self-powered neutron detector 1 is not changed, i.e., there is no consumption of the emitter material 1a, the detector sensitivity of the self-powered neutron detector 1 at a measurement start time (time point t0) is a detector sensitivity S0 at the measurement start time (time point t0) when the self-powered neutron detector 1 has started neutron measurement. In this case, the neutron flux sent from the neutron flux counting unit 2 to a neutron flux correction calculation unit 11 is represented by the following Expression (2).

[Mathematical 2]

$$\Phi' = I/S_0 \tag{2}$$

Here, $\Phi'$ is the value of the neutron flux measured by the neutron flux counting unit 2 at the measurement start time (time point t0).

The value of the detector sensitivity changes as the emitter material 1a of the self-powered neutron detector 1 is consumed through radioactivation. Therefore, it is necessary to correct the detector sensitivity, in order to accurately measure a neutron flux at a (time point t1) which is a time point when a measurement period T2 as a second set period has elapsed from the measurement start time (time point t0).

In the following description, the time point t1 when the measurement period T2 has elapsed from the time point t0 is described as the present time.

Hereinafter, the principle for correcting the detector sensitivity of the self-powered neutron detector 1 will be described.

The amount by which the emitter material 1a of the self-powered neutron detector 1 is radio-activated by neutrons in the nuclear reactor is represented by the following Expression (3).

[Mathematical 3]

$$dN/dt = -\sigma \cdot N \cdot \Phi \tag{3}$$

Here, N is the number of atoms to be radio-activated in the emitter material 1a of the self-powered neutron detector 1.

$\sigma$ is a nuclear cross-section which indicates the probability that a particle incident on the emitter material 1a of the self-powered neutron detector 1 reacts with an atomic nucleus in the emitter material 1a.

$\Phi$ is a neutron flux entering the emitter material 1a of the self-powered neutron detector 1.

The nuclear cross-section is cited from an evaluated nuclear data library published by any country, e.g., in Japan, Japanese evaluated nuclear data library (JENDL), or in the US, an evaluated nuclear data file (ENDF), etc.

The neutron flux entering the emitter material 1a of the self-powered neutron detector 1 changes depending on output of the nuclear reactor, and thus is a function of time as shown by the above Expression (3). The above Expression (3) is solved for the number N of atoms to be radio-activated at the detector sensing portion of the self-powered neutron detector 1, to obtain the following Expression (4).

[Mathematical 4]

$$N = N_0 \cdot \exp(-\sigma \cdot \int \Phi dt) \tag{4}$$

Here, N0 is the number of atoms at the measurement start time (time point t0) when the self-powered neutron detector 1 has started neutron flux measurement.

From the above Expression (4), it is found that the number N of atoms by which the emitter material 1a of the self-powered neutron detector 1 in the nuclear reactor is radio-activated and decreased is influenced by a result of integration of the neutron flux from the neutron flux measurement start time (time point t0) to the present time (time point t1) when the measurement period T2 has elapsed.

Here, the detector sensitivity of the self-powered neutron detector 1 in the nuclear reactor is proportional to the number of atoms of the emitter material 1a, and therefore can be represented by the following Expression (5).

[Mathematical 5]

$$S = K \cdot \sigma \cdot N_0 \cdot \exp(-\sigma \cdot \int \Phi dt) \tag{5}$$

Here, S is the detector sensitivity of the self-powered neutron detector 1 at the present time (time point t1).

K is a proportionality coefficient between the detector sensitivity of the self-powered neutron detector 1 and the number of atoms of the emitter material 1a of the self-powered neutron detector 1.

From the above Expression (5), it is found that, as measurement for the neutron flux is continued, the detector sensitivity decreases with elapse of time. Therefore, in a case where correction for the detector sensitivity is not performed, even if the neutron flux in the nuclear reactor is not changed, the neutron flux is measured as if the neutron flux is decreased apparently.

Here, calculation for correcting the detector sensitivity of the self-powered neutron detector 1 can be represented by the following Expression (6).

[Mathematical 6]

$$S = S_0 \cdot \exp(-\sigma \cdot \int \Phi dt) \tag{6}$$

Here, S0 is the detector sensitivity of the self-powered neutron detector 1 at the neutron flux measurement start time (time point t0).

As shown by the above Expression (6), the detector sensitivity S of the self-powered neutron detector 1 at the present time (time point t1) can be derived by correcting the detector sensitivity S0 of the self-powered neutron detector 1 at the neutron flux measurement start time (time point t0) by an amount represented by an exp function.

Here, ideally, while the neutron flux is continuously measured, integration is performed over the measurement period T2 as shown by the above Expression (6), whereby a correction amount can be accurately calculated. However, in actuality, a measurement interval during the measurement period T2 is finite, and therefore correction amount calculation is performed by a difference expression as shown by the following Expression (7).

[Mathematical 7]

$$S = S_0 \cdot \exp(-\sigma \cdot \Sigma(\Phi \cdot \Delta t)) \tag{7}$$

Here, $\Delta t$ is the measurement interval during the measurement period T2.

Here, as described below with reference to the drawing, in a case where the measurement interval $\Delta t$ for the neutron flux is finite, if the measurement interval $\Delta t$ is made shorter than a period in which the nuclear reactor output or the neutron flux in the nuclear reactor changes, the influence due to changing of the correction calculation expression from Expression (6) to Expression 0) can be eliminated.

Figure 3:
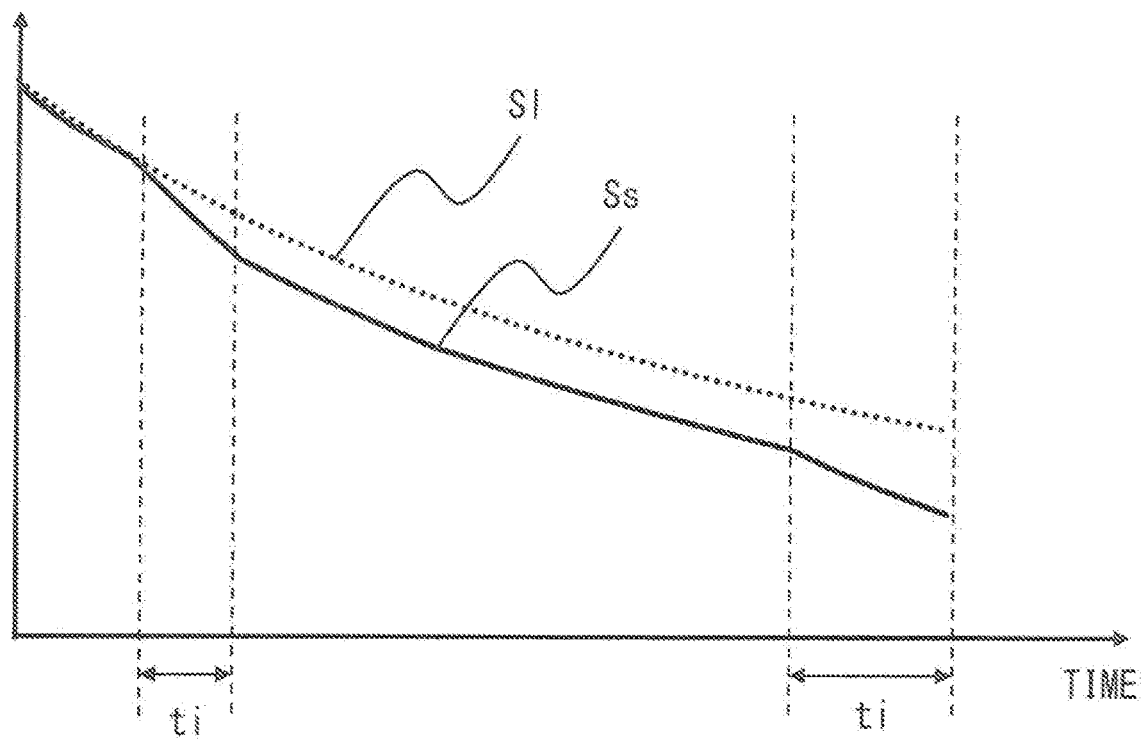
FIG. 3 shows change in a corrected detector sensitivity.

FIG. 3 shows change in the corrected detector sensitivity on the basis of the above Expression (7).

FIG. 3 shows a detector sensitivity Ss corrected in a case where the measurement interval $\Delta t$ for measuring the neutron flux is made shorter than a period in which the nuclear reactor output or the neutron flux in the nuclear reactor changes, and a detector sensitivity S1 corrected in a case where the measurement interval at is made longer.

In general, in a period t1 in which the neutron flux in the nuclear reactor increases, decrease in the detector sensitivity becomes sharp in accordance with increase in the neutron flux irradiation amount, whereas when the neutron flux decreases, decrease in the detector sensitivity becomes mild. As shown in FIG. 3, in the case where the measurement interval $\Delta t$ is longer than the period in which the nuclear reactor output or the neutron flux in the nuclear reactor changes, the detector sensitivity si is not accurately corrected.

As described below, in the calculation unit 10 of the present embodiment, the measurement interval Δt for the neutron flux during the measurement period T2 for the neutron flux is made shorter than the period in which the neutron flux in the nuclear reactor changes, whereby neutron flux measurement is accurately performed.

Hereinafter, control in which the calculation unit 10 of the neutron flux measurement apparatus 100 of the present embodiment corrects the neutron flux counted at the present time (time point t1) in accordance with the degree of consumption for the detector sensitivity of the self-powered neutron detector. I will be described.

With reference to FIG. 1 again, the calculation unit 10 includes the neutron flux correction calculation unit 11, a neutron flux storage unit 12, and a detector sensitivity correction calculation unit 13.

First, the neutron flux storage unit 12 will be described.

The neutron flux storage unit 12 has a function of storing and retaining the detected value of the neutron flux, and is formed by a memory, a hard disk, an external storage medium, or the like, and such a storage medium is selected in accordance with the amount of record data to be stored.

The neutron flux storage unit 12 stores, in advance, a plurality of neutron flux count values counted during a first set period T1 before the measurement start time point t0, as record data D. The plurality of neutron fluxes in the record data D are each recorded in association with adjustment control for output of the nuclear reactor performed during the first set period T1. Therefore, the plurality of neutron fluxes in the record data D indicate change in the count value of the neutron flux in the nuclear reactor corresponding to the adjustment control for output of the nuclear reactor.

Next, control of the detector sensitivity correction calculation unit 13 will be described.

The detector sensitivity correction calculation unit 13 performs correction for the detector sensitivity of the self-powered neutron detector 1 at the present time (time point t1) on the basis of the record data D recorded in the neutron flux storage unit 12.

As described above, the record data D recorded in the neutron flux storage unit 12 indicates change in the count value of the neutron flux in the nuclear reactor corresponding to adjustment control for output, of the nuclear reactor, counted during the past first set period T1.

By referring to the recorded record data D, the detector sensitivity correction calculation unit 13 of the present embodiment estimates a time interval Δtc in which the neutron flux in the nuclear reactor changes during the measurement period T2, on the basis of adjustment control for the nuclear reactor at the measurement start time (time point t0) of the measurement period T2 after the first set period T1. Then, the detector sensitivity correction calculation unit 13 sets the measurement interval Δt during the measurement period T2 so as to be shorter than the estimated time interval Δtc in which the neutron flux in the nuclear reactor changes.

During the measurement period T2, measurement for the neutron flux is performed by the neutron flux counting unit 2 at each set measurement interval at. The plurality of measured neutron fluxes are recorded in the record data D in the neutron flux storage unit 12. Then, using the plurality of neutron flux measurement values recorded in the record data D, the detector sensitivity correction calculation unit 13 performs correction for the detector sensitivity of the self-powered neutron detector 1 at the present time (time point t1) on the basis of the above Expression (7).

As described above, the detector sensitivity correction calculation unit 13 accurately derives the detector sensitivity at the present time (time point t1), using the plurality of neutron fluxes measured at each measurement interval Δt which is shorter than the time interval Δtc in which the neutron flux changes in accordance with the output adjustment control for the nuclear reactor.

The derived detector sensitivity at the present time (time point t1) is inputted to the neutron flux correction calculation unit 11.

The neutron flux correction calculation unit 11 corrects the neutron flux inputted from the neutron flux counting unit 2 by an amount corresponding to change in the corrected detector sensitivity inputted from the detector sensitivity correction calculation unit 13, to calculate a neutron flux.

The above neutron flux calculation performed by the neutron flux correction calculation unit 11 will be described.

Using the corrected detector sensitivity at the present time (time point t1) sent from the detector sensitivity correction calculation unit 13, the neutron flux correction calculation unit 11 corrects the value of the neutron flux inputted from the neutron flux counting unit 2, as shown by the following Expression (8).

[Mathematical 8]

$$\Phi = \Phi' \cdot (S_0/S) \tag{8}$$

Here, $\Phi$ is the corrected value of the neutron flux measured by the neutron flux counting unit 2.

$\Phi'$ is the value of the neutron flux before correction, measured by the neutron flux counting unit 2.

The neutron flux correction calculation unit 11 sends the corrected neutron flux at the present time (time point t1) to the neutron flux storage unit 12.

The neutron flux storage unit 12 records the corrected neutron flux at the present time (time point t1), in the record data D, and uses the recorded neutron flux in correction for a neutron flux after the present time (t1).

C Further, the neutron flux correction calculation unit 11 outputs the obtained corrected neutron flux to the high-order device 3.

The high-order device 3 is a device for processing the neutron flux sent from the neutron flux correction calculation unit 11, and includes, for example, a computer for nuclear reactor control, a display screen for nuclear reactor state monitoring, etc.

As described above, in the neutron flux measurement apparatus of the present embodiment, even. In a case where the degree of deterioration of the self-powered neutron detector changes in accordance with adjustment of output control for the nuclear reactor, the actual neutron flux in the nuclear reactor at the present time, which does not depend on the deterioration degree, can be accurately derived.

The neutron measurement apparatus of the present embodiment configured as described above includes:

a self-powered detector which detects a neutron in a nuclear reactor;

a neutron flux counting unit which measures a neutron flux in the nuclear reactor on the basis of output of the self-powered detector;

a storage unit which records, as record data, a measured value indicating chance in the neutron flux in the nuclear reactor corresponding to adjustment control for output of the nuclear reactor during a first set period; and a calculation unit which, on the basis of the record data, performs correction for a detector sensitivity to a neutron of the self-powered detector at a time point t1 in accordance with the adjustment control during a second set period after the first set period, the time point t1 being a time point when the second set period has elapsed, and derives the neutron flux at the time point t1 using the corrected detector sensitivity.

As described above, the neutron flux measurement apparatus includes the storage unit which records, as record data, a measured value indicating change in the neutron flux in the nuclear reactor corresponding to adjustment control for output of the nuclear reactor during the past first set period. Then, on the basis of the record data during the past first set period, the neutron flux measurement apparatus performs correction for the detector sensitivity to a neutron at the time point t1 which is the present time when the measurement period has elapsed, in accordance with adjustment control for the nuclear reactor during the second set period which is the measurement period.

Thus, even in a case where output of the nuclear reactor frequently changes by adjustment control during the second set period which is the measurement period, it is possible to perform correction for the detector sensitivity in accordance with change in the neutron irradiation amount due to the adjustment control for the nuclear reactor. Therefore, it is possible to obtain an accurate neutron flux that does not depend on change in the deterioration degree of the self-powered detector due to change in the neutron irradiation amount.

In addition, since it is possible to accurately perform correction for the detector sensitivity of the self-powered neutron detector 1 in accordance with output change of the nuclear reactor as described above, it is not necessary to separately provide a calibration detector in the reactor. Therefore, correction error is prevented from occurring due to discrepancy between the neutron irradiation amount at the position where the self-powered neutron detector as a correction target is placed and the value of the irradiation amount at the calibration detector, for example.

In addition, since it is not necessary to separately provide the calibration detector in the reactor, the number of devices does not increase and extra work for device repairing and maintenance is not needed, whereby the cost can be reduced.

In the neutron measurement apparatus of the present embodiment configured as described above, the calculation unit estimates a time interval $\Delta tc$ in which a count of the neutron flux in the nuclear reactor changes corresponding to the adjustment control for the nuclear reactor during the second set period, on the basis of the record data, and adjusts a measurement interval it of the neutron flux counting unit during the second set period on the basis of the time interval $\Delta tc$, to perform correction for the detector sensitivity of the self-powered detector at the time point t1.

As described above, by using the record data indicating change in the neutron flux corresponding to adjustment control for output of the nuclear reactor in the past, the neutron measurement apparatus can estimate the time interval $\Delta tc$ in which the neutron flux changes corresponding to adjustment control for output of the nuclear reactor during the second set period which is the measurement period.

Then, by adjusting the measurement interval $\Delta t$ during the measurement period on the basis of the accurately estimated time interval $\Delta tc$ in which the neutron flux changes, it is possible to perform accurate correction for the detector sensitivity in accordance with change in the neutron irradiation amount due to adjustment control for output of the nuclear reactor.

In the neutron measurement apparatus of the present embodiment configured as described above, the measurement interval $\Delta t$ is set to be shorter than the estimated time interval $\Delta tc$.

Thus, even in a case where output of the nuclear reactor frequently changes during the second set period which is the measurement period and the neutron flux in the nuclear reactor increases or decreases, the detector sensitivity can be accurately corrected.

In the neutron measurement apparatus of the present embodiment con-figured as described above, the calculation unit derives the detector sensitivity of the self-powered detector at the time point t1, using the detector sensitivity of the self-powered detector at a time point t0 which is a measurement start time point of the second set period, by the following Expression:

[Mathematical 7]

$$S=S_0 \cdot \exp(-\sigma \cdot \Sigma(\Phi \cdot \Delta t)) \tag{7}$$

where

S is the detector sensitivity of the self-powered detector at the time point t1, S0 is the detector sensitivity of the self-powered detector at the time point t0, $\sigma$ is a nuclear cross-section with a neutron, of the self-powered detector, and $\varphi$ is the neutron flux at a measurement time point for each measurement interval, and in correction for the detector sensitivity of the self-powered detector at the time point t1, the calculation unit uses the neutron fluxes at all the measurement time points measured during the second set period.

As described above, in a case where the measurement interval $\Delta t$ for the neutron flux is finite, the neutron measurement apparatus performs correction for the detector sensitivity of the self-powered detector at the time point t1 which is the present time, using the neutron fluxes at the measurement time points for all the respective measurement intervals $\Delta t$ measured during the second set period which is the measurement period.

Thus, since all the neutron fluxes measured for the respective measurement intervals $\Delta t$ are used and calculation for large-scale approximation is not performed, increase in accumulation of correction errors can be suppressed and accurate correction for the detector sensitivity can be performed.

Embodiment 2

Hereinafter, a neutron flux measurement apparatus 200 of the present embodiment 2 will be described with reference to the drawings, focusing on difference from embodiment 1. The same parts as those in embodiment 1 are denoted by the same reference characters and the description thereof is omitted.

Figure 4:
FIG. 4 is a block diagram showing the schematic configuration of a neutron flux measurement apparatus according to embodiment 2.

FIG. 4 is a block diagram showing the schematic configuration of the neutron flux measurement apparatus 200 according to embodiment 2.

In embodiment 1, the detector sensitivity correction calculation unit 13 performs correction for the detector sensitivity in accordance with adjustment control for output of the nuclear reactor without depending on change in the deterioration degree of the self-powered detector.

As shown in FIG. 4, the detector sensitivity correction calculation unit 13 of the present embodiment receives a reactor internal temperature Ta in the nuclear reactor. Then, the detector sensitivity correction calculation unit 13 performs correction for the detector sensitivity in which the temperature dependence of the nuclear cross-section of the self-powered detector is reflected on the basis of the received reactor internal temperature Ta in the nuclear reactor.

Here, the reactor internal temperature Ta may be measured by a plurality of thermometers for measuring temperatures around the emitter materials 1a of the self-powered neutron detectors 1 placed in the reactor, for example. Alternatively, the reactor internal temperature Ta may be measured by at least one thermometer for measuring a representative reactor internal temperature Ta in the nuclear reactor.

The reactor internal temperature Ta may be directly inputted to the sensitivity correction calculation unit from the thermometer, or the reactor internal temperature Ta aggregated into the high-order device 3 once or the reactor internal temperature Ta calculated by a reactor core simulator or the like may be used.

Hereinafter, the temperature dependence of the nuclear cross-section will be described. The nuclear cross-section differs among isotopes of each element with respect to energy of a neutron.

Figure 5:
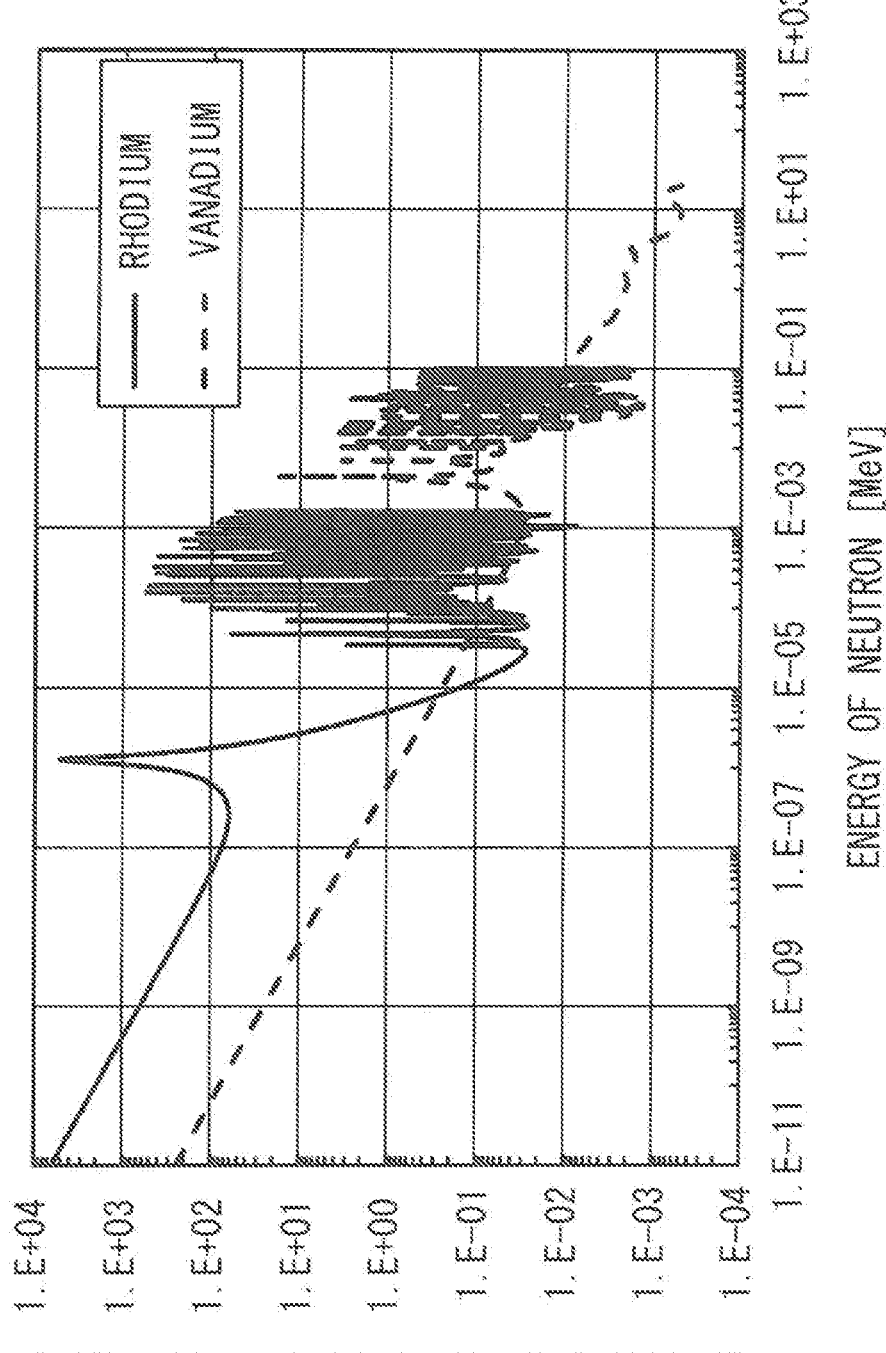
FIG. 5 shows changes in neutron capture nuclear cross-sections for rhodium and vanadium.

FIG. 5 shows changes in the neutron capture nuclear cross-sections for rhodium and vanadium of the emitter material 1a used in a general self-powered neutron detector 1.

Figure 6:
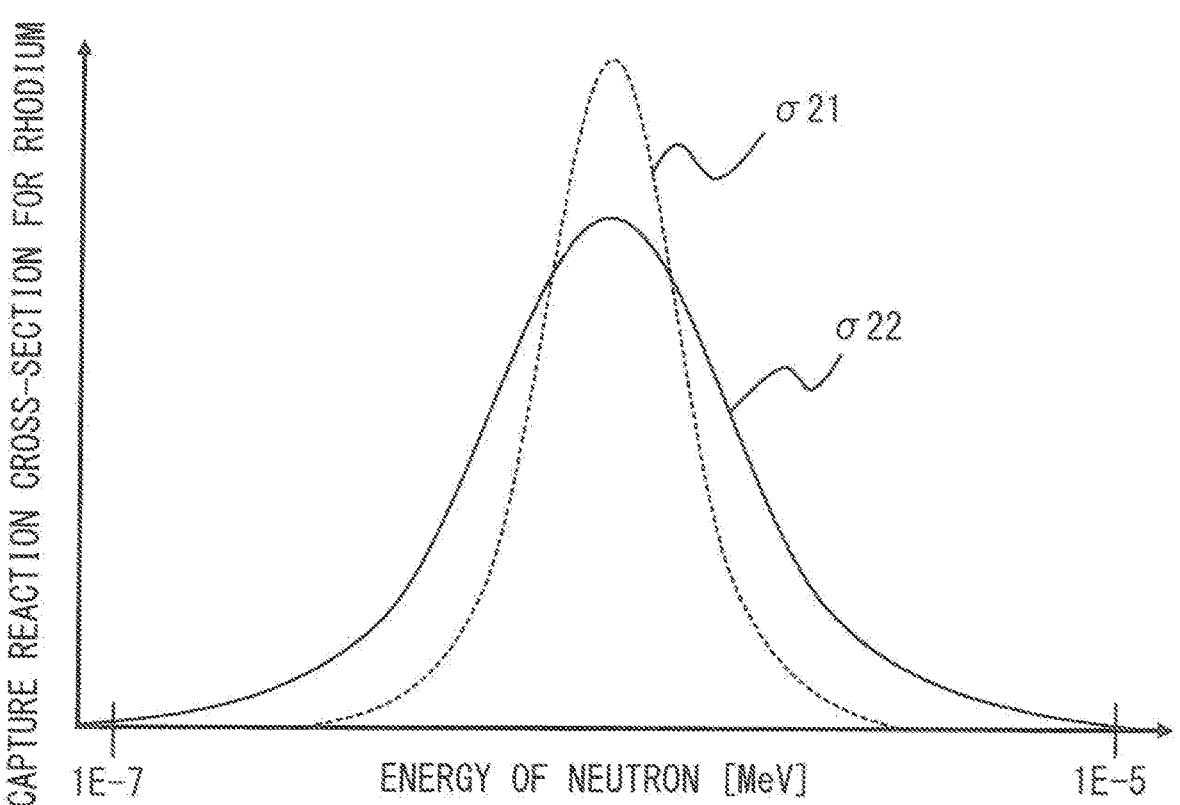
FIG. 6 is a schematic diagram showing the temperature dependence of a nuclear cross-section.

FIG. 6 is a schematic diagram showing the temperature dependence of the nuclear cross-section.

In FIG. 6, a nuclear cross-section σ21 at low temperature and a nuclear cross-section σ22 at high temperature are shown.

It is generally known that the nuclear cross-section correlates with the temperature, due to an effect called Doppler effect in which, when the reactor internal temperature Ta rises, thermal motion of an atomic nucleus of a material becomes active so that a neutron is more readily absorbed.

For example, in a case of using rhodium as the emitter material 1a of the self-powered neutron detector 1, as shown in FIG. 6, the nuclear cross-section in an energy band called a resonance absorption peak having a characteristic peak shape in a specific neutron energy band changes in its shape, due to the temperature dependence having the Doppler effect. Therefore, when the reactor internal temperature rises, the nuclear cross-section σ21 at low temperature changes to the nuclear cross-section σ22 at high temperature. Thus, when the reactor internal temperature Ta rises, due to the Doppler effect, the probability of interacting with a neutron increases, so that the emitter material 1a is consumed faster than at low temperature and the detector sensitivity is reduced.

For example, in a case of the operation mode in which nuclear reactor output is frequently changed, control rods are inserted or pulled out to adjust nuclear reaction in the reactor core. In addition, in a case of a pressurized water reactor, the concentration of boric acid to be diluted in a cooling material is adjusted, or in a case of a boiling water reactor or the like, the flow rate in the reactor is adjusted, whereby the reactor internal temperature Ta based on nuclear reaction is changed and thus the nuclear reactor output is adjusted.

At this time, in particular, when control rods are inserted or pulled out, local adjustment of nuclear reaction is performed, whereby the reactor internal temperature Ta is also changed locally. Therefore, in correction for the detector sensitivity performed by the detector sensitivity correction calculation unit 13, by reflecting the reactor internal temperature Ta in the nuclear cross-section, accuracy for correcting consumption of the emitter material 1a can be improved. Thus, it is possible to prevent a calculation result from being too small or too great as compared to the actual value.

Although the extent is not as great as when control rods are inserted or pulled out, the reactor core temperature exhibits a temperature distribution also by adjustment of the boric acid concentration or the flow rate, etc. Therefore, by associating correction for the detector sensitivity with the temperature dependence of the nuclear cross-section at each measurement time point, accuracy for correcting consumption of the emitter material 1a can be reliably ensured.

Accordingly, in order that accuracy for correcting consumption of the emitter material 1a corresponds to the reactor core temperature, with respect to the above Expression (7) for calculating the detector sensitivity of the detector sensitivity correction calculation unit 13, the nuclear cross-section due to the Doppler effect can be represented by Expression (9) using a function σ(t) with respect to the reactor internal temperature Ta.

[Mathematical 9]

$$S = S_0 \cdot \exp(\Sigma(-\sigma(-\sigma(t) \cdot \Phi \cdot \Delta t))) \tag{9}$$

As the reactor internal temperature Ta, a value corresponding to the temperature at a time point of measurement of the neutron flux to be used for the detector sensitivity correction calculation unit 13 is applied.

The nuclear cross-section with respect to the reactor internal temperature Ta may be given from a result of making the nuclear cross-section with respect to the reactor internal temperature Ta into a function, or a value that matches or is close to the corresponding reactor internal temperature Ta may be given in advance from nuclear cross-section data with respect to the reactor internal temperature Ta discretized.

As described above, the nuclear cross-section is cited from an evaluated nuclear data library published by any country, but since the nuclear cross-section with respect to temperature is prepared discretely with respect to representative temperatures, the nuclear cross-section data with respect to the reactor internal temperature Ta may be created by making a function with respect to the reactor internal temperature Ta, by performing discretization with interpolation or extrapolation, or by using actual measurement, simulation, or the like.

The neutron measurement apparatus of the present embodiment configured as described above further includes a thermometer which detects a reactor internal temperature of the nuclear reactor, and the calculation unit corrects a value of the nuclear cross-section with a neutron of the self-powered detector, in accordance with the temperature detected by the thermometer.

As described above, since the temperature dependence of the nuclear cross-section of causing radioactivation of self-powered neutron detector can be reflected in accordance with the detected reactor internal temperature, it is possible to perform correction for the detector sensitivity of the self-powered neutron detector more accurately even in a case where the temperature frequently changes in the nuclear reactor.

In the neutron flux measurement apparatus of the present embodiment configured as described above, the calculation unit corrects the nuclear cross-section of the self-powered detector on the basis of a function indicating change in the nuclear cross-section at each measurement time point due to a Doppler effect through temperature change or data obtained by discretizing the nuclear cross-section corresponding to the temperature of the nuclear reactor for each temperature.

As described above, in correction for the nuclear cross-section, by using a function indicating change in the nuclear cross-section at each measurement time point due to the Doppler effect through temperature change or data obtained by discretizing the nuclear cross-section corresponding to the temperature of the nuclear reactor for each temperature, it is possible to accurately perform correction for the detector sensitivity of the self-powered neutron detector in accordance with temperature change.

Embodiment 3

Hereinafter, a neutron flux measurement apparatus of the present embodiment 3 will be described with reference to the drawings, focusing on difference from embodiment 2. The same parts as those in embodiment 2 are denoted by the same reference characters and the description thereof is omitted.

Figure 7:
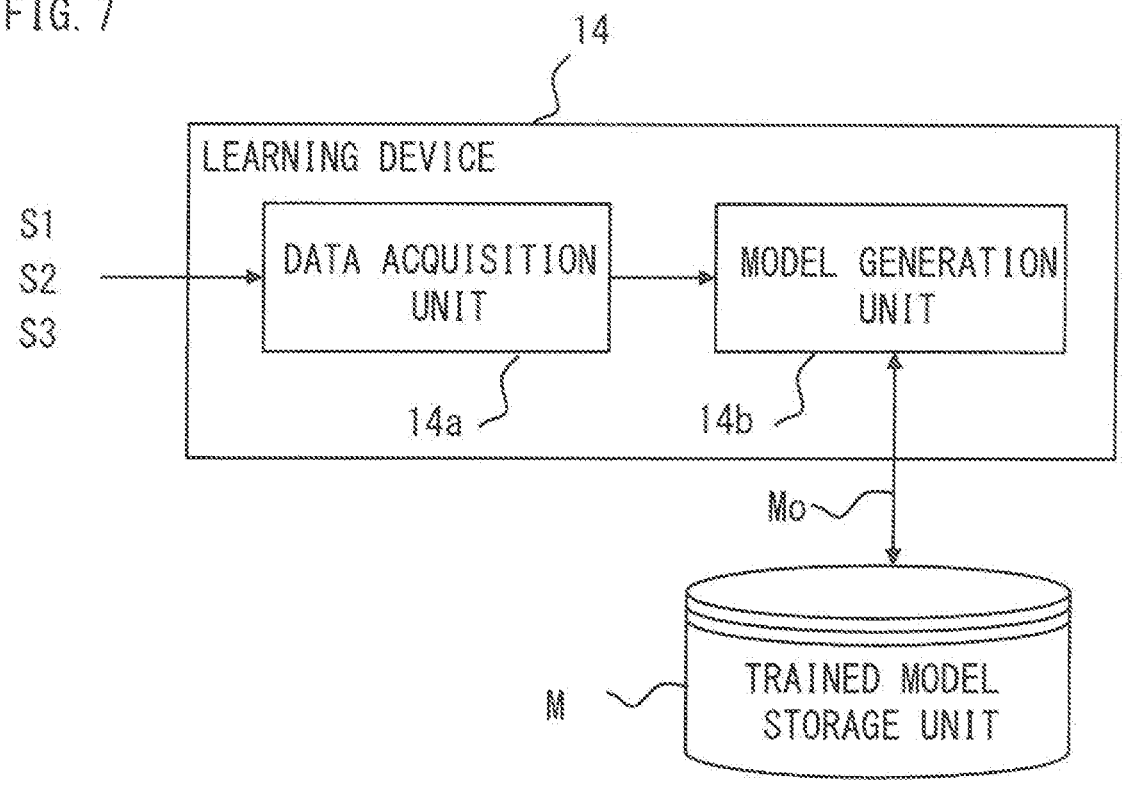
FIG. 7 is a configuration diagram of a learning device included in a calculation unit for a neutron flux measurement apparatus according to embodiment 3.

FIG. 7 is a configuration diagram of a learning device 14 included in the calculation unit 10 for the neutron flux measurement apparatus according to embodiment 3.

In embodiment 3, the calculation unit 10 further includes the learning device 14 and an inference device 15 described below.

First, the configuration of the learning device 14 will be described.

As shown in FIG. 7, the learning device 14 includes a data acquisition unit 14a, a model generation unit 14b, and a trained model storage unit M. Hereinafter, these units will be described.

The data acquisition unit 14a acquires a first input signal S1, a second input signal 32, and a third input signal. S3 as learning data.

The first input signal S1 is a measured value of a neutron flux outputted from the neutron flux counting unit 2.

The second input signal S2 is various plant parameters indicating the operation state of the nuclear reactor. The various plant parameters indicating the operation state of the nuclear reactor in the second input signal S2 are parameters about adjustment of nuclear reactor output, such as the adjustment control amount for output of the nuclear reactor, the reactor internal temperature Ta, the amount of insertion/pulling out of control rods, the flow rate of a reactor internal cooling material, and the boric acid concentration in the cooling material, for example.

As the second input signal S2, at least one of such parameters is used.

These parameters are relevant to form a distribution of the neutron flux in the nuclear reactor, and influence the neutron irradiation amount of the self-powered neutron detector 1. However, it is generally difficult to uniquely associate them with consumption of the emitter material 1a of the self-powered neutron detector 1.

The third input signal. S3 is an ideal detector sensitivity derived on the basis of theoretical calculation, and is a detector sensitivity that is derived through calculation performed by the neutron flux measurement apparatus in embodiment 1 or 2 and does not depend on the deterioration degree of the self-powered detector.

Further, the third input signal includes a neutron flux that is derived through calculation performed by the neutron flux measurement apparatus in embodiment 1 or 2 and does not depend on the deterioration degree of the self-powered detector.

The data acquisition unit 14a outputs the acquired first input signal S1, second input signal S2, and third input signal S3 as learning data to the model generation unit 14b.

The model generation unit 14b learns the detector sensitivity and the neutron flux that correspond to the inputted measured value of the neutron flux and the inputted operation state of the nuclear reactor and do not depend on the deterioration degree of the self-powered detector 1, on the basis of the first input signal S1, the second input signal S2, and the third input signal S3 outputted from the data acquisition unit 14a.

That is, the model generation unit 14b generates a trained model Mo for inferring the detector sensitivity and the neutron flux that do not depend on the deterioration degree of the self-powered detector 1 from the neutron flux outputted from the neutron flux counting unit 2, various plant parameters, and the ideal detector sensitivity and neutron flux based on theoretical calculation.

As described above, the first input signal S1, the second input signal S2, and the third input signal S3 are learning data in which the neutron flux outputted from the neutron flux counting unit 2, various plant parameters indicating the state of the nuclear reactor, and the ideal neutron flux based on theoretical calculation are associated with each other.

The ideal neutron flux derived through theoretical calculation, indicated by the third input signal S3, may be obtained in advance by a general neutron and photon transport. Monte Carlo code capable of criticality calculation, e.g., Monte Carlo codes (MVP) or Monte Carlo N-Particle code (MCNP), or by a deterministic method using a neutron transport equation or a neutron diffusion equation, and means a neutron flux at the position where the self-powered neutron detector 1 is placed, obtained by reproducing a reactor core model.

The reactor core model is reproduced by including parameters about the type and arrangement of a fuel assembly composing the nuclear reactor and also about adjustment of output of the nuclear reactor such as the control rod position.

As a learning algorithm used in the model generation unit 14b, a known algorithm such as supervised learning, unsupervised learning, or reinforcement learning can be used. As an example, a case of applying a neural network will be described.

The model generation unit 14b learns the detector sensitivity and the neutron flux that do not depend on the deterioration degree of the detector, through so-called supervised learning, in accordance with a neural network model, for example.

Here, the supervised learning is a method in which a pair of data of an input and a result (label) are given to the learning device 14 to learn features of these learning data, thereby inferring a result from an input.

The neural network is composed of an input layer formed by a plurality of neurons, an intermediate layer (hidden layer) formed by a plurality of neurons, and an output layer formed by a plurality of neurons. The number of intermediate layers may be one, or two or more.

Figure 8:
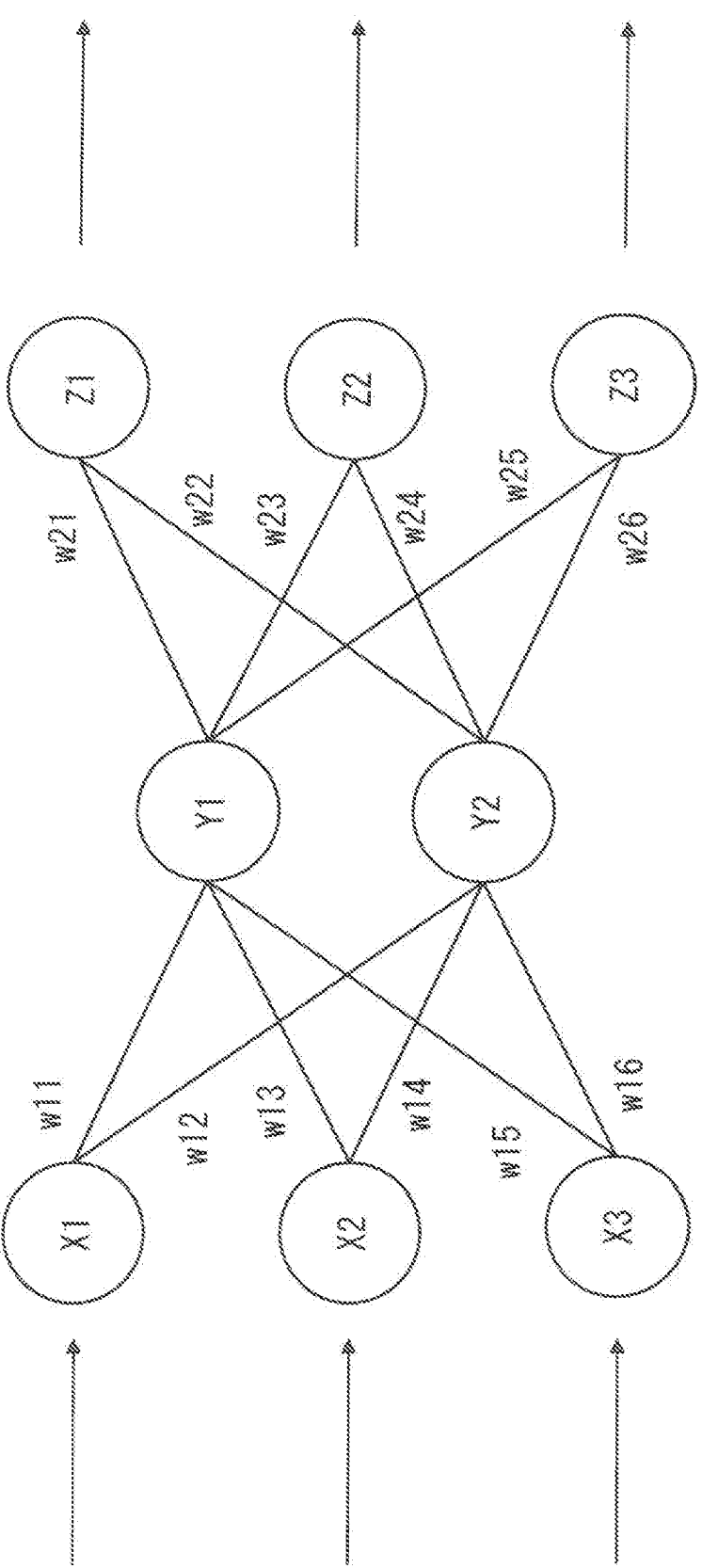
FIG. 8 shows the configuration of a neural network according to embodiment 3.

For example, in a three-layer neural network as shown in FIG. 8, when a plurality of inputs are inputted to an input layer (X1-X3), the values thereof are multiplied by weights W1 ($w$11-$w$16) and the resultant values are inputted to an intermediate layer (Y1-Y2). Then, these values are further multiplied by weights W2 ($w$21-$w$26) and the resultant values are outputted from an output layer (Z1-Z13). The above output result varies by the values of the weights W1 and W2.

In the present disclosure, the neural network learns the detector sensitivity and the neutron flux that do not depend on the deterioration degree of the detector, by so-called supervised learning, in accordance with learning data generated on the basis of combination of the first input signal S1 indicating the neutron flux outputted from the neutron flux counting unit 2, the second input signal S2 indicating various plant parameters, and the third input signal S3 indicating the ideal detector sensitivity and neutron flux based on theoretical calculation, which are acquired by the data acquisition unit 14$a$, as described above.

That is, the neural network performs learning by adjusting the weights W1 and W2 so that a result outputted from the output layer when the neutron flux outputted from the neutron flux counting unit 2 and various plant parameters are inputted to the input layer becomes close to an ideal detection value and an ideal neutron flux based on theoretical calculation.

Next, with reference to FIG. 9, processing for learning in the learning device 14 will be described.

Figure 9:
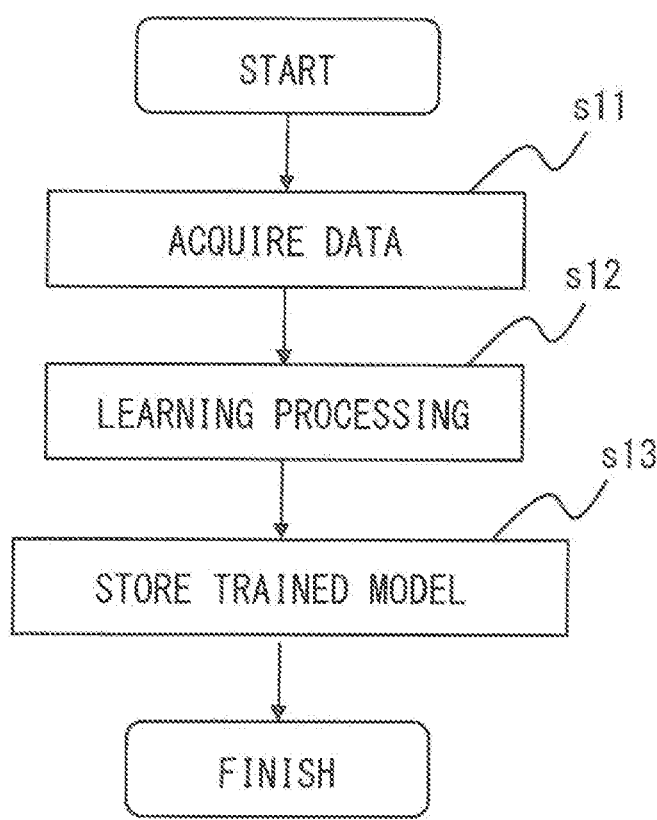
FIG. 9 is a flowchart for learning processing of the learning device according to embodiment 3.

FIG. 9 is a flowchart for learning processing of the learning device 14 according to embodiment 3.

First, in step s11, the data acquisition unit 34$a$ acquires the first input signal S1 during the first set period T1, the second input signal S2 during the first set period T1, and the third input signal S3.

The first input signal S1, the second input signal. S2, and the third input signal S3 may not necessarily be acquired at the same time. The first input signal S1, the second input signal S2, and the third input signal S3 only have to be inputted in association with each other, and they may be acquired at different timings.

In step s12, the model generation unit 14$b$ learns the detector sensitivity and the neutron flux that do not depend on the deterioration degree of the self-powered neutron detector by supervised learning, in accordance with learning data based on combination of the first input signal S1, the second input signal S2, and the third input signal S3 acquired by the data acquisition unit 14$a$, and generates the trained model Mo.

In step s13, the trained model storage unit M stores the trained model Mo generated by the model generation unit 14$b$.

Through the above steps s11 to s13, learning in which the neutron flux outputted from the neutron flux counting unit 2, various plant parameters indicating the state of the nuclear reactor, and the ideal neutron flux based on theoretical calculation are associated with each other, is executed, and the trained model Mo is generated and stored.

Next, operation of the inference device 15 for utilizing the stored trained model Mo will be described.

Figure 10:
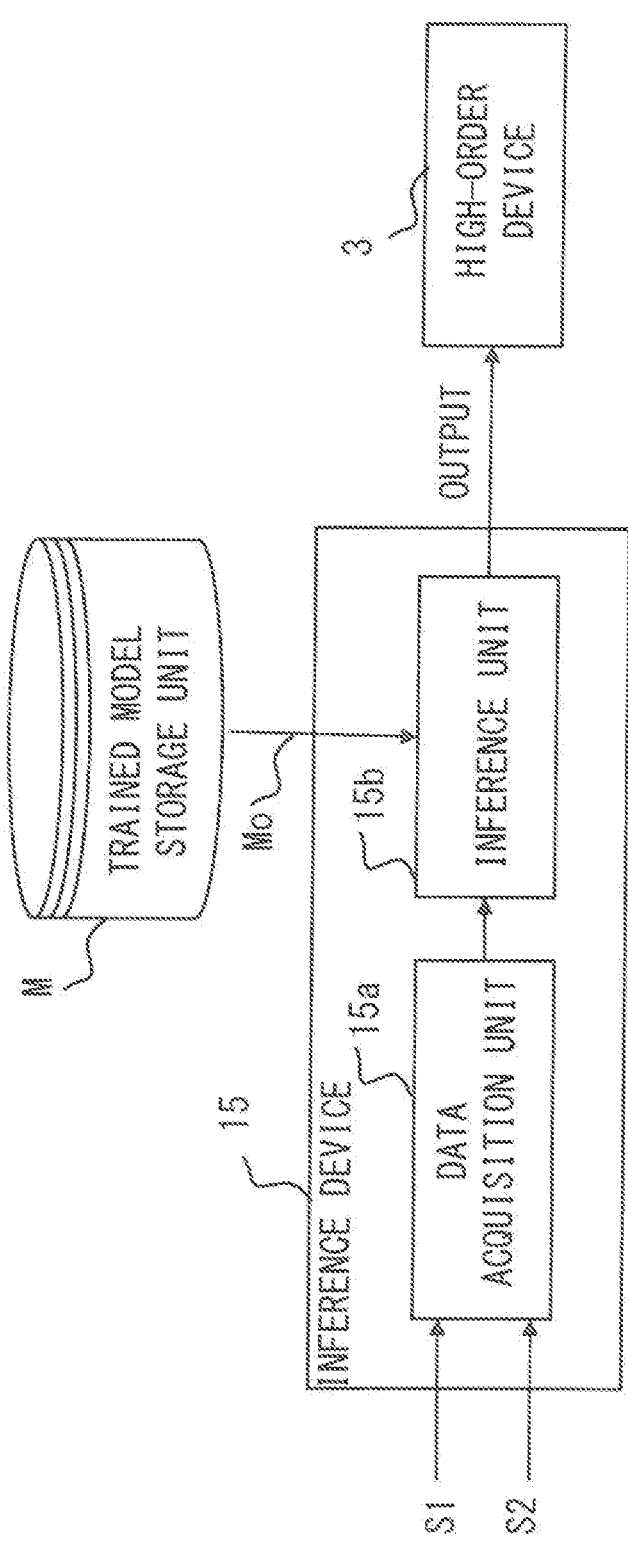
FIG. 10 shows the configuration of an inference device for the neutron flux measurement apparatus according to embodiment 3.

FIG. 10 shows the configuration of the inference device 15 for the neutron flux measurement apparatus according to embodiment 1.

The inference device 15 includes a data acquisition unit 15$a$ and an inference unit 15$b$.

The data acquisition unit 15$a$ acquires the first input signal S11 indicating the neutron flux outputted from the neutron flux counting unit 2 and the second input signal S2 indicating various plant parameters during the second set period T2, and outputs them to the inference unit 15$b$.

The inference unit 15$b$ infers the detector sensitivity and the neutron flux that do not depend on the deterioration degree of the self-powered neutron detector 1 and are obtained using the trained model Mo, on the basis of the inputted first input signal S1 and second input signal S2.

That is, using the trained model Mo, it is possible to output the detector sensitivity and the neutron flux that do not depend or the deterioration degree of the self-powered neutron detector 1 from the first input signal S1 indicating the neutron flux outputted from the neutron flux counting unit 2 and the second input signal S2 indicating various plant parameter, which are acquired by the data acquisition unit 15$a$.

Next, with reference to FIG. 10, processing for obtaining the detector sensitivity and the neutron flux that do not depend on the deterioration degree of the self-powered neutron detector 1 using the inference device 15 will be described.

Figure 11:
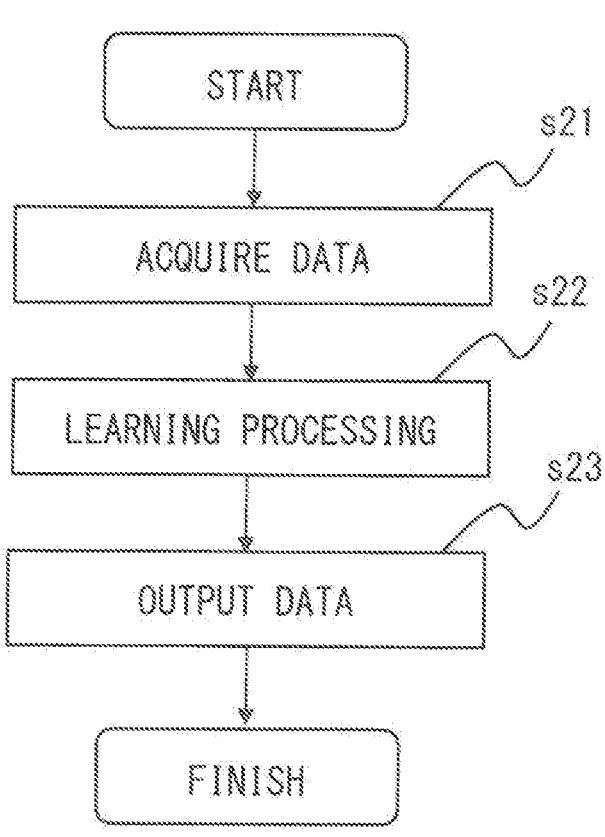
FIG. 11 is a flowchart for learning processing of the inference device according to embodiment 3.

FIG. 11 is a flowchart for learning processing of the inference device 15 according to embodiment 3.

First, in step s21, the data acquisition unit 15$a$ acquires the first input signal S1 indicating the neutron flux outputted from the neutron flux counting unit 2 and the second input signal S2 indicating various plant parameters indicating the operation state of the nuclear reactor during the second set period T2 after the first set period T1.

In step s22, the inference unit 15$k$ inputs the first input signal S1 and the second input signal S2 to the trained model Mo stored in the trained model storage unit. M, and obtains the detector sensitivity and the neutron flux that do not depend on the deterioration degree of the self-powered neutron detector 1.

In step s23, the inference unit 15$b$ outputs the detector sensitivity and the neutron flux that do not depend on the deterioration degree of the self-powered neutron detector 1 and are obtained by the trained model Mo, to the high-order device 3.

Thus, even in the operation mode in which the nuclear reactor output is frequently changed, reduction in the sensitivity due to consumption of the emitter material 1$a$ in accordance with the neutron irradiation amount of the self-powered neutron detector 1 is compensated, whereby an accurate neutron flux can be outputted to the high-order device 3.

In the present embodiment, the case of applying supervised learning to the learning algorithm used in the model generation unit 14$b$ has been described. However, the present disclosure is not limited thereto. As the learning algorithm, reinforcement learning, unsupervised learning, semi-supervised learning, or the like may be applied instead of supervised learning.

The model generation unit 14$b$ may learn the neutron flux that does not depend on the deterioration degree of the self-powered neutron detector 1, in accordance with learning data created with respect to a plurality of neutron flux measurement apparatuses.

The model generation unit 14$b$ may acquire learning data from a plurality of neutron flux measurement apparatuses used in the same area, or may use learning data collected from a plurality of neutron flux measurement apparatuses operating independently of each other in different areas, to learn the detector sensitivity and the neutron flux that do not depend on the deterioration degree of the self-powered neutron detector 1.

A neutron flux measurement apparatus for collecting learning data may be added as a target at a certain time, or may be excluded from targets.

Further, the learning device having learned the neutron flux that does not depend on the deterioration degree of the self-powered neutron detector 1 for a certain neutron flux measurement apparatus may be applied to another neutron flux measurement apparatus, and then may learn again the neutron flux that does not depend on the deterioration degree of the self-powered neutron detector 1 for the other neutron flux measurement apparatus, so as to be updated.

As the learning algorithm used in the model generation unit, deep learning in which extraction of feature quantities themselves is learned may be used, or machine learning may be executed in accordance with another known method such as genetic programming, inductive logic programming, or a support vector machine, for example.

The learning device and the inference device, which are used for learning the detector sensitivity and the neutron flux that do not depend on the deterioration degree of the self-powered neutron detector of the neutron flux measurement apparatus, may be devices that are connected to the neutron flux measurement apparatus via a network and are separate from the neutron flux measurement apparatus, for example.

The learning device and the inference device may be included in the neutron flux measurement apparatus. The learning device and the inference device may be present on a cloud server.

In the present embodiment, it has been described that the neutron flux that does not depend on the deterioration degree of the self-powered neutron detector 1 is outputted using a trained model obtained through learning by the model generation unit of the neutron flux measurement apparatus. However, a trained model may be acquired from the outside, e.g., another neutron flux measurement apparatus, and a neutron flux that does not depend on the deterioration degree of the self-powered neutron detector 1 may be outputted on the basis of the acquired trained model.

Figure 12:
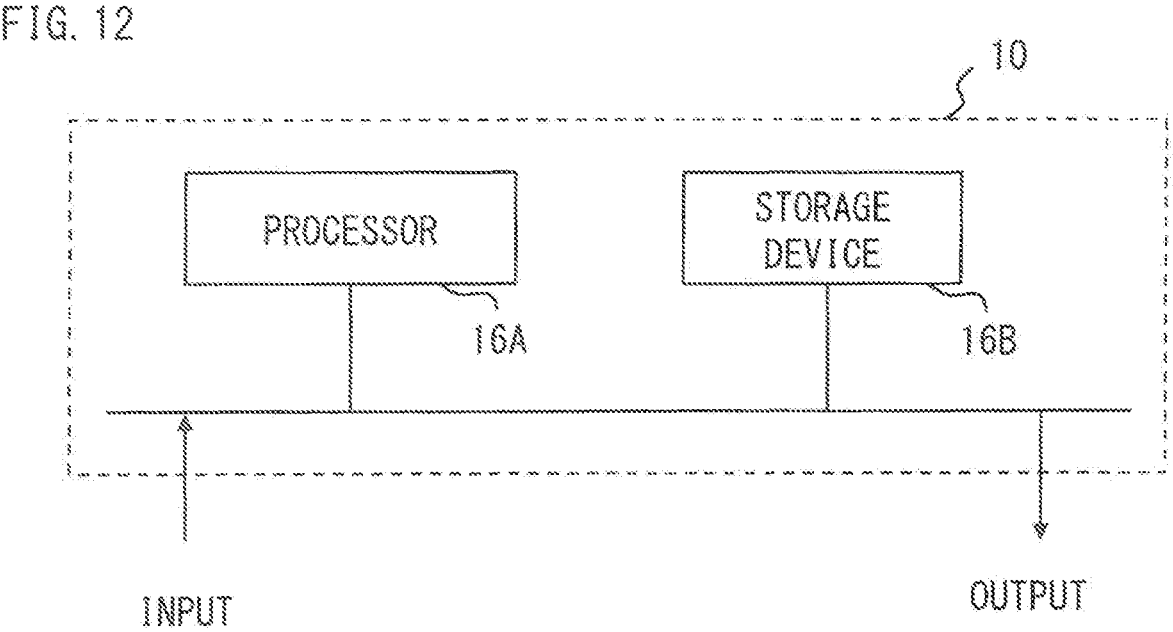
FIG. 12 shows an example of the hardware configuration of the calculation unit according to embodiment 3.

FIG. 12 shows an example of the hardware configuration of the calculation unit 10 according to embodiment 3.

The hardware of the calculation unit 10 is composed of a processor 16A and a storage device 16B, as shown in FIG. 12 which shows a configuration example thereof. The storage device 168 is provided with a volatile storage device such as a random access memory and a nonvolatile auxiliary storage device such as a flash memory, which are not shown.

Instead of the flash memory, an auxiliary storage device of a hard disk may be provided. The processor 16A executes a program inputted from the storage device 16B. In this case, the program is inputted from the auxiliary storage device to the processor 16A via the volatile storage device. The processor 16A may output data such as a calculation result to the volatile storage device of the storage device 16B, and may store such data into the auxiliary storage device via the volatile storage device.

In the neutron flux measurement apparatus of the present embodiment configured as described above, the calculation unit includes a data acquisition unit which acquires learning data including a first input signal outputted from the self-powered detector of the neutron flux measurement apparatus detecting a neutron in the nuclear reactor during the first set period, a second input signal indicating an operation state of the nuclear reactor during the first set period, and a third input signal indicating the neutron flux and the detector sensitivity of the self-powered detector that correspond to the first input signal and the second input signal, and a model generation unit which, using the learning data, generates a trained model for inferring the neutron flux and the detector sensitivity to a neutron of the self-powered detector during the second set period, from the first input signal and the second input signal during the second set period after the first set period, and the neutron flux and the detector sensitivity of the self-powered detector used for the third input signal are derived through control by the calculation unit of the neutron flux measurement apparatus according to embodiment 1 or 2.

In the neutron flux measurement apparatus of the present embodiment configured as described above, the calculation unit includes an inference unit which, using the trained model, outputs the neutron flux and the detector sensitivity to a neutron of the self-powered detector during the second set period, from the first input signal and the second input signal.

As described above, in the neutron flux measurement apparatus, the detector sensitivity and the neutron flux that do not depend on the deterioration degree of the self-powered detector are learned from a measured value of the neutron flux outputted from the neutron flux counting unit during the past first set period, various plant parameters indicating the operation state of the nuclear reactor during the past first set period, and the ideal detector sensitivity and neutron flux derived through theoretical calculation.

Then, the detector sensitivity and the neutron flux that do not depend on the deterioration degree of the self-powered detector can be inferred from a measured value of the neutron flux outputted from the neutron flux counting unit during the later second set period and various plant parameters indicating the operation state of the nuclear reactor during the second set period.

Thus, the neutron flux measurement apparatus that has an improved processing capability and can infer the detector sensitivity and the neutron flux with high accuracy, s obtained.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 self-powered neutron detector
2 neutron flux counting unit
10 calculation unit
12 neutron flux storage unit storage unit)
100, 200 neutron flux measurement apparatus

The invention claimed is:

1. A neutron flux measurement apparatus comprising:
a self-powered detector which detects a neutron in a nuclear reactor;
a neutron flux counting circuitry which measures a neutron flux in the nuclear reactor on the basis of output of the self-powered detector;
a storage which records, as record data, a measured value indicating change, during a first set period, in the neutron flux in the nuclear reactor corresponding to adjustment control for output of the nuclear reactor; and
a calculation circuitry which, on the basis of the record data, performs correction for a detector sensitivity to a neutron of the self-powered detector at a time point t1 in accordance with the adjustment control during a second set period after the first set period, the time point t1 being a time point when the second set period has elapsed, and derives the neutron flux at the time point t1 using the corrected detector sensitivity.

2. The neutron flux measurement apparatus according to claim 1, wherein
the calculation circuitry
estimates a time interval Δtc in which a count of the neutron flux in the nuclear reactor changes corresponding to the adjustment control for the nuclear reactor during the second set period, on the basis of the record data, and
adjusts a measurement interval Δt of the neutron flux counting circuitry during the second set period on the basis of the time interval Δtc, to perform correction for the detector sensitivity of the self-powered detector at the time point t1.

3. The neutron flux measurement apparatus according to claim 2, wherein
the measurement interval Δt is set to be shorter than the time interval Δtc estimated by the calculation circuitry.

4. The neutron flux measurement apparatus according to claim 3, wherein
the calculation circuitry derives the detector sensitivity of the self-powered detector at the time point t1, using the detector sensitivity of the self-powered detector at a time point to which is a measurement start time point of the second set period, by the following Expression (1):

$$S=S_0 \cdot \exp(-\sigma \cdot \Sigma(\Phi \cdot \Delta t)) \tag{1}$$

where
S is the detector sensitivity of the self-powered detector at the time point t1,
S0 is the detector sensitivity of the self-powered detector at the time point t,
σ is a nuclear cross-section with a neutron, of the self-powered detector, and
φ is the neutron flux at a measurement time point for each measurement interval, and
in correction for the detector sensitivity of the self-powered detector at the time point t1, the calculation circuitry uses the neutron fluxes at all the measurement time points measured during the second set period.

5. The neutron flux measurement apparatus according to claim 4, wherein
the calculation circuitry corrects the nuclear cross-section of the self-powered detector on the basis of a function indicating change in the nuclear cross-section at each measurement time point due to a Doppler effect through temperature change or data obtained by dis-cretizing the nuclear cross-section corresponding to the temperature of the nuclear reactor for each temperature.

6. The neutron flux measurement apparatus according to claim 4, further comprising a thermometer which detects a reactor internal temperature of the nuclear reactor, wherein
the calculation circuitry corrects a value of the nuclear cross-section with a neutron of the self-powered detector, in accordance with the temperature detected by the thermometer, and performs correction for the detector sensitivity to a neutron of the self-powered detector at the time point t1, using the corrected nuclear cross-section.

7. The neutron flux measurement apparatus according to claim 6, wherein
the calculation circuitry corrects the nuclear cross-section of the self-powered detector on the basis of a function indicating change in the nuclear cross-section at each measurement time point due to a Doppler effect through temperature change or data obtained by dis-cretizing the nuclear cross-section corresponding to the temperature of the nuclear reactor for each temperature.

8. The neutron flux measurement apparatus according to claim 3, wherein
the calculation circuitry includes
a data acquisition circuitry which acquires learning data including a first input signal outputted from the self-powered detector of the neutron flux measurement apparatus detecting a neutron in the nuclear reactor during the first set period, a second input signal indicating an operation state of the nuclear reactor during the first set period, and a third input signal indicating the neutron flux and the detector sensitivity of the self-powered detector that correspond to the first input signal and the second input signal, and
a model generation circuitry which, using the learning data, generates a trained model for inferring the neutron flux and the detector sensitivity to a neutron of the self-powered detector during the second set period, from the first input signal and the second input signal during the second set period after the first set period, and
the neutron flux and the detector sensitivity of the self-powered detector used for the third input signal are the corrected detector sensitivity and the neutron flux at the time point t1 obtained using the corrected detector sensitivity derived through control by the calculation circuitry.

9. The neutron flux measurement apparatus according to claim 8, wherein
the calculation circuitry includes an inference circuitry which, using the trained model, outputs the neutron flux and the detector sensitivity to a neutron of the self-powered detector during the second set period, from the first input signal and the second input signal.

10. The neutron flux measurement apparatus according to claim 2, wherein
the calculation circuitry derives the detector sensitivity of the self-powered detector at the time point t1, using the detector sensitivity of the self-powered detector at a time point to which is a measurement start time point of the second set period, by the following Expression (1):

$$S=S_0 \cdot \exp(-\sigma \cdot \Sigma(\Phi \cdot \Delta t)) \tag{1}$$

where

S is the detector sensitivity of the self-powered detector at the time point t1, S0 is the detector sensitivity of the self-powered detector at the time point to, σ is a nuclear cross-section with a neutron, of the self-powered detector, and φ is the neutron flux at a measurement time point for each measurement interval, and in correction for the detector sensitivity of the self-powered detector at the time point t1, the calculation circuitry uses the neutron fluxes at all the measurement time points measured during the second set period.

11. The neutron flux measurement apparatus according to claim 10, wherein the calculation circuitry includes a data acquisition circuitry which acquires learning data including a first input signal outputted from the self-powered detector of the neutron flux measurement apparatus detecting a neutron in the nuclear reactor during the first set period, a second input signal indicating an operation state of the nuclear reactor during the first set period, and a third input signal indicating the neutron flux and the detector sensitivity of the self-powered detector that correspond to the first input signal and the second input signal, and a model generation circuitry which, using the learning data, generates a trained model for inferring the neutron flux and the detector sensitivity to a neutron of the self-powered detector during the second set period, from the first input signal and the second input signal during the second set period after the first set period, and the neutron flux and the detector sensitivity of the self-powered detector used for the third input signal are the corrected detector sensitivity and the neutron flux at the time point t1 obtained using the corrected detector sensitivity derived through control by the calculation circuitry.

12. The neutron flux measurement apparatus according to claim 10, further comprising a thermometer which detects a reactor internal temperature of the nuclear reactor, wherein the calculation circuitry corrects a value of the nuclear cross-section with a neutron of the self-powered detector, in accordance with the temperature detected by the thermometer, and performs correction for the detector sensitivity to a neutron of the self-powered detector at the time point t1, using the corrected nuclear cross-section.

13. The neutron flux measurement apparatus according to claim 12, wherein the calculation circuitry corrects the nuclear cross-section of the self-powered detector on the basis of a function indicating change in the nuclear cross-section at each measurement time point due to a Doppler effect through temperature change or data obtained by discretizing the nuclear cross-section corresponding to the temperature of the nuclear reactor for each temperature.

14. The neutron flux measurement apparatus according to claim 12, wherein the calculation circuitry includes a data acquisition circuitry which acquires learning data including a first input signal outputted from the self-powered detector of the neutron flux measurement apparatus detecting a neutron in the nuclear reactor during the first set period, a second input signal indicating an operation state of the nuclear reactor during the first set period, and a third input signal indicating the neutron flux and the detector sensitivity of the self-powered detector that correspond to the first input signal and the second input signal, and a model generation circuitry which, using the learning data, generates a trained model for inferring the neutron flux and the detector sensitivity to a neutron of the self-powered detector during the second set period, from the first input signal and the second input signal during the second set period after the first set period, and the neutron flux and the detector sensitivity of the self-powered detector used for the third input signal are the corrected detector sensitivity and the neutron flux at the time point t1 obtained using the corrected detector sensitivity derived through control by the calculation circuitry.

15. The neutron flux measurement apparatus according to claim 10, wherein the calculation circuitry corrects the nuclear cross-section of the self-powered detector on the basis of a function indicating change in the nuclear cross-section at each measurement time point due to a Doppler effect through temperature change or data obtained by discretizing the nuclear cross-section corresponding to the temperature of the nuclear reactor for each temperature.

16. The neutron flux measurement apparatus according to claim 15, wherein the calculation circuitry includes a data acquisition circuitry which acquires learning data including a first input signal outputted from the self-powered detector of the neutron flux measurement apparatus detecting a neutron in the nuclear reactor during the first set period, a second input signal indicating an operation state of the nuclear reactor during the first set period, and a third input signal indicating the neutron flux and the detector sensitivity of the self-powered detector that correspond to the first input signal and the second input signal, and a model generation circuitry which, using the learning data, generates a trained model for inferring the neutron flux and the detector sensitivity to a neutron of the self-powered detector during the second set period, from the first input signal and the second input signal during the second set period after the first set period, and the neutron flux and the detector sensitivity of the self-powered detector used for the third input signal are the corrected detector sensitivity and the neutron flux at the time point t1 obtained using the corrected detector sensitivity derived through control by the calculation circuitry.

17. The neutron flux measurement apparatus according to claim 2, wherein the calculation circuitry includes a data acquisition circuitry which acquires learning data including a first input signal outputted from the self-powered detector of the neutron flux measurement apparatus detecting a neutron in the nuclear reactor during the first set period, a second input signal indicating an operation state of the nuclear reactor during the first set period, and a third input signal indicating the neutron flux and the detector sensitivity of the self-powered detector that correspond to the first input signal and the second input signal, and a model generation circuitry which, using the learning data, generates a trained model for inferring the neutron flux and the detector sensitivity to a neutron of the self-powered detector during the second set period, from the first input signal and the second input signal during the second set period after the first set period, and the neutron flux and the detector sensitivity of the self-powered detector used for the third input signal are the corrected detector sensitivity and the neutron flux at the time point t1 derived through control by the calculation circuitry.

18. The neutron flux measurement apparatus according to claim 17, wherein the calculation circuitry includes an inference circuitry which, using the trained model, outputs the neutron flux and the detector sensitivity to a neutron of the self-powered detector during the second set period, from the first input signal and the second input signal.

19. The neutron flux measurement apparatus according to claim 1, wherein the calculation circuitry includes a data acquisition circuitry which acquires learning data including a first input signal outputted from the self-powered detector of the neutron flux measurement apparatus detecting a neutron in the nuclear reactor during the first set period, a second input signal indicating an operation state of the nuclear reactor during the first set period, and a third input signal indicating the neutron flux and the detector sensitivity of the self-powered detector that correspond to the first input signal and the second input signal, and a model generation circuitry which, using the learning data, generates a trained model for inferring the neutron flux and the detector sensitivity to a neutron of the self-powered detector during the second set period, from the first input signal and the second input signal during the second set period after the first set period, and the neutron flux and the detector sensitivity of the self-powered detector used for the third input signal are the corrected detector sensitivity and the neutron flux at the time point t1 obtained using the corrected detector sensitivity derived through control by the calculation circuitry.

20. The neutron flux measurement apparatus according to claim 19, wherein the calculation circuitry includes an inference circuitry which, using the trained model, outputs the neutron flux and the detector sensitivity to a neutron of the self-powered detector during the second set period, from the first input signal and the second input signal.

21. A neutron flux measurement apparatus comprising:

a self-powered detector which detects a neutron in a nuclear reactor;

a neutron flux counting circuitry which measures a neutron flux in the nuclear reactor on the basis of output of the self-powered detector;

a storage which records, as record data, a measured value indicating change in the neutron flux in the nuclear reactor corresponding to adjustment control for output of the nuclear reactor during a first set period; and a calculation circuitry which, on the basis of the record data, performs correction for a detector sensitivity to a neutron of the self-powered detector at a time point t1 in accordance with the adjustment control during a second set period after the first set period, the time point t1 being a time point when the second set period has elapsed, and derives the neutron flux at the time point t1 using the corrected detector sensitivity, wherein the calculation circuitry estimates a time interval Δtc in which a count of the neutron flux in the nuclear reactor changes corresponding to the adjustment control for the nuclear reactor during the second set period, on the basis of the record data, and adjusts a measurement interval Δt of the neutron flux counting circuitry during the second set period on the basis of the time interval Δtc, to perform correction for the detector sensitivity of the self-powered detector at the time point t1.

* * * * *